United States Patent
Kurisawa

(10) Patent No.: US 8,402,620 B2
(45) Date of Patent: Mar. 26, 2013

(54) POSITIVE ELECTRODE CURRENT COLLECTOR FOR LEAD ACCUMULATOR

(75) Inventor: Isamu Kurisawa, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 13/343,247

(22) Filed: Jan. 4, 2012

(65) Prior Publication Data

US 2012/0107492 A1    May 3, 2012

Related U.S. Application Data

(62) Division of application No. 12/088,011, filed as application No. PCT/JP2006/319488 on Sep. 29, 2006, now abandoned.

(30) Foreign Application Priority Data

Sep. 29, 2005    (JP) .................................. 2005-285131

(51) Int. Cl.
*H01M 4/68*    (2006.01)
*H01M 4/82*    (2006.01)
(52) U.S. Cl. .......................................... 29/2; 29/623.5
(58) Field of Classification Search .............. 29/2, 623.5
See application file for complete search history.

(56) References Cited

U.S. PATENT DOCUMENTS

| 4,326,017 | A |   | 4/1982 | Will |
| 5,601,945 | A | * | 2/1997 | Clough .......................... 429/204 |
| 6,866,885 | B1 | * | 3/2005 | Clough .......................... 427/212 |
| 2009/0130557 | A1 |   | 5/2009 | Fujita |

FOREIGN PATENT DOCUMENTS

| JP | 07-065821 A | 3/1995 |
| JP | 07-073871 A | 3/1995 |
| JP | 10-053418 A | 2/1998 |
| JP | 2003-242983 A | 8/2003 |

OTHER PUBLICATIONS

International Search Report of PCT/JP2006/319488, date of mailing Jan. 23, 2007.
Kurisawa et al., "Development of positive electrodes with an SnO2 coating by applying a sputtering technique for lead-acid batteries", Journal of Power Sources, vol. 95, Issues 1-2, Mar. 15, 2001, pp. 125-129.

* cited by examiner

*Primary Examiner* — Gregg Cantelmo
(74) *Attorney, Agent, or Firm* — Westerman, Hattori, Daniels & Adrian, LLP

(57) ABSTRACT

In a positive electrode current collector for a lead-acid battery including a coating of tin dioxide formed on the surface of a current collector substrate of titanium or a titanium alloy, the half width of a peak with the maximum intensity among peaks of tin dioxide in the x-ray diffraction pattern of the positive electrode current collector for a lead-acid battery is 1° or lower.

2 Claims, 4 Drawing Sheets

POSITIVE ELECTRODE CURRENT COLLECTOR FOR LEAD ACCUMULATOR

The present application is a divisional application from U.S. Ser. No. 12/088,011 filed on Mar. 25, 2008, which is now abandoned, and is a national stage application under 35 U.S.C. §371 from PCT/JP2006/319488 filed on Sep. 29, 2006, which claims the foreign priority of Japanese Patent Application No. 2005-285131 filed on Sep. 29, 2005.

BACKGROUND OF THE INVENTION

1. Field of the Invention

The present invention relates to a positive electrode current collector for a lead-acid battery having a coating on the surface.

2. Description of the Related Art

A lead-acid battery has a low energy density as compared with a nickel-metal hydride battery and a lithium ion battery. One of the causes is that lead or a lead alloy to be used as a positive electrode current collector is thick and heavy. Therefore, use of titanium or a titanium alloy (hereinafter, referred to as titanium or the like) for the positive electrode current collector and formation of a conductive oxide layer of tin dioxide or the like as a coating on the surface of titanium or the like have been proposed (reference to Japanese Patent Application Laid-Open (JP-A) No. 55-64377 and Japanese Patent No. 3482605). It is because use of titanium or the like makes a positive electrode current collector lightweight because of the lower specific gravity of titanium or the like than that of lead.

However, in the case where a positive electrode current collector made of solely titanium or the like is used for a lead-acid battery, although hard, titanium or the like is slightly dissolved in diluted sulfuric acid, which is an electrolytic solution, and accordingly there occurs a problem. Therefore, a tin dioxide which is insoluble in diluted sulfuric acid, which is an electrolytic solution, is formed as a coating on the surface of titanium or the like.

Moreover, in the case of forming tin dioxide on the surface of titanium or the like, there are advantageous points: (i) tin dioxide shows high electrochemical stability when it is positive electrode potential in an electrolytic solution; (ii) voltage decrease by existence of the coating of tin dioxide with low conductivity can be suppressed by titanium or the like with high conductivity; and (iii) since the melting point of titanium or the like is high, it can stand firing around 500° C. in a step of forming a tin dioxide coating.

As a method for forming the tin dioxide coating on the surface of a current collector substrate are generally employed a dip coating method and a spin coating method. Specifically, the coating of tin dioxide is formed by applying a raw material solution containing tin on titanium or the like and thereafter heating them. Further, a technique of forming a tin dioxide coating on the surface of a glass substrate by a spray method is also proposed (e.g., Japanese Patent No. 3271906, or J. J. Rowlette, American Chemical Society, 1052 (1986))

In Japanese Patent No. 3271906, in a first step, a first raw material solution obtained by dissolving an organic compound such as dibutyltin diacetate in an organic solvent is atomized in a spray form on the surface of a heated glass substrate. At that time, in order to avoid a factor of crystallinity decrease, an element such as antimony and fluorine having outermost electrons in a number higher by one than that of tin or oxygen is not added to the first raw material solution. The sprayed first raw material solution is thermally decomposed on the surface of the heated glass substrate to form an undercoating layer selectively oriented to a specified crystal plane. Next, a second raw solution obtained by adding an element having outermost electrons in a number higher by one than that of tin or oxygen to the first raw solution is atomized in a spray form on the surface of the undercoating layer.

SUMMARY OF THE INVENTION

However, in the case where a lead-acid battery is produced using a current collector substrate of titanium or the like having a coating of tin dioxide on the surface, there is a problem that the life performance of the lead-acid battery is inferior. The inventors of the present invention have made investigations on its cause and accordingly have made it clear that the crystallinity of tin dioxide formed as a coating affects the life performance. Conventionally, no attention has been paid to the crystallinity of tin dioxide in form of the coating.

According to the dip coating method and spin coating method described in the paragraphs of Related Art described above, in the case of forming tin dioxide on a current collector substrate of titanium or the like, the applied raw material solution is thermally decomposed from a surface side far from the current collector substrate. Therefore, crystal cores are produced in crystal planes having various directions on the surface side of the raw material solution and along with the proceeding of the thermal decomposition, crystals are respectively grown from the crystal cores. If the crystals of various crystal planes are grown, points where the crystals of different crystal planes are adjacent to one another are increased to increase crystal strains. As a result, the crystallinity decreases.

Further, in the case where the crystallinity decreases, points where the distance between a tin atom and an oxygen atom is not as in a standard crystal state are increased to lower the chemical stability. Accordingly, the life performance of a lead-acid battery using the current collector substrate deteriorates.

Under the above-mentioned state of the problems, the present invention aims to solve the problems according to the following means.

A positive electrode current collector for a lead-acid battery of the present invention is a positive electrode current collector for a lead-acid battery including a coating of tin dioxide formed on the surface of a current collector substrate of titanium or a titanium alloy and is characterized in that the half width of a peak with the maximum intensity among peaks of tin dioxide in the x-ray diffraction pattern of the positive electrode current collector for a lead-acid battery is 1° or lower.

In the case where a lead-acid battery is produced using such a positive electrode current collector, the life performance of the lead-acid battery becomes excellent. The results of specific experiments will be described later.

As titanium is used titanium (JIS 1 type) or titanium (JIS 2 type). As a titanium alloy are used Ti-5Al-2.5V, Ti-3Al-2.5V, and Ti-6Al-4V.

In the x-ray diffractometry of the present application, while x-ray (CuKα ray) is radiated to a specimen, scanning is carried out at an incident angle θ in a prescribed range and during that time, the intensity of diffracted x-ray is counted. If a diffraction angle 2θ is plotted in an abscissa axis and diffraction intensity is plotted in an ordinate axis, the x-ray diffraction pattern is obtained. According to the x-ray diffraction pattern, based on the crystal structure of tin dioxide coating which is a specimen and the wavelength of radiated x-ray, the types of crystal planes corresponding to the diffraction angles 2θ at which the peaks of the x-ray diffraction intensity appear can be specified. In this application, 2θ is set in a range of 26.6° to 108.4°.

The term "peaks" means hill-like parts in the x-ray diffraction pattern. The respective peaks correspond to crystal planes. The term "half width" means a diffraction angular width of the peak curve in the x-ray diffraction intensity at which the intensity (x-ray diffraction intensity at a summit in the peak curve) of the peak becomes ½. If the half width is narrow, the peak has a sharp hill-like shape and the crystallinity of the crystal plane can be said to be high. On the other hand, if the half width is broad, the peak has gentle hill-like shape with a spread toward the bottom and the crystallinity of the crystal plane can be said to be low.

In order to produce such a positive electrode current collector for a lead-acid battery, a production method described below may be employed.

The positive electrode current collector for a lead-acid battery of the present invention is a positive electrode current collector for a lead-acid battery having a coating of tin dioxide formed on the surface of a current collector substrate of titanium or a titanium alloy and is characterized in that the above-mentioned crystals of tin dioxide are selectively oriented in 1 or more and 4 or less of the crystal planes.

In the case where a lead-acid battery is produced using such a positive electrode current collector, the life performance of the lead-acid battery becomes excellent. Results of specific experiments will be described later.

Herein, the phrase "selectively oriented in the crystal planes" means the case that the texture coefficient TC of the crystal planes is 1 or more. For example, the texture coefficient TC of a (110) plane is 1 or more, it can be expressed that the crystal is oriented in the (110) plane. A calculation method of the texture coefficient TC will be described in a first embodiment.

The present invention is characterized in that the oriented crystal planes as described above are a (110) plane, a (101) plane, a (200) plane, a (211) plane, a (220) plane, a (310) plane, a (112) plane, or a (301) plane.

In the case where titanium or the like has an oriented tin dioxide coating on the above-mentioned crystal plane, the life performance of the lead-acid battery produced using the positive electrode current collector becomes excellent.

The present invention is characterized in that the coating contains antimony or fluorine in the positive electrode current collector for a lead-acid battery.

Since the coating contains antimony or fluorine, the conductivity of the coating is remarkably improved. In the case where the conductivity of the coating is high, since the inner resistance of the lead-acid battery is lowered, the life performance of the lead-acid battery becomes further excellent and the effect of the present invention is more apparently caused. In the case of comparison of antimony with fluorine, antimony is better.

A positive electrode current collector for a lead-acid battery having a coating on the surface of a current collector substrate of the present invention is produced by the following method. That is, the production method involves a step of intermittently spraying a raw material solution obtained by dissolving a tin compound in a solvent to the surface of a heated current collector substrate made of titanium or a titanium alloy.

Accordingly, a coating of tin dioxide with high crystallinity is formed on the surface of titanium or the like. As a result, in the case where a lead-acid battery is produced using the positive electrode current collector produced by this production method, the life performance of the lead-acid battery becomes excellent.

In this production method, as the tin compound, organotin compounds such as dibutyltin diacetate, tributoxytin, and the like and inorganic tin compounds such as tin tetrachloride may be employed. As a solvent, an organic solvent such as ethanol, butanol, and the like may be employed. To add antimony to the raw material solution obtained by dissolving a tin compound in a solvent, a method of mixing a chloride of antimony may be employed.

In execution of the production method, it is required to heat the current collector substrate in order to thermally decompose the tin compound in the raw material solution when the raw material solution is sprayed to the current collector substrate. The temperature suitable for the heating depends on the type of the tin compound. For example, in the case of using a raw material solution obtained by mixing an antimony chloride solution (solvent: ethanol) with a dibutyl tin diacetate solution (solvent: ethanol), the temperature is 400° C. or higher. It is preferably 450° C. or higher and most preferably 500° C. or higher.

At the time of spraying the raw material solution to the surface of the current collector substrate, spraying is repeated at intervals, so that the temperature is not decreased. That is, spraying is carried out intermittently.

The thickness of the coating of tin dioxide to be formed by one time spraying is required to be 5 nm or thinner. It is because a coating of tin dioxide with high crystallinity can be obtained by the production method by which such a thin coating is layered. Further, it is because crystals of tin dioxide to be formed on the surface of titanium or the like can be selectively oriented in one or more and 4 or less of the crystal planes.

In order to form such a thin coating, it is preferable to adjust a spraying amount at one time is 0.4 cc or less. It is because, although it depends on other conditions for the production, 0.4 cc or less of the spraying amount is suitable for layering the coating of 5 nm or thinner.

The reason for the possibility of obtaining high crystallinity by layering of the coating formed in such a thin thickness is not clearly understood. However, it is probably attributed to that titanium oxide existing on the surface of the current collector substrate and oxides of titanium and tin formed in the initial stage of the coating formation become an undercoat layer and tin dioxide forming the coating is epitaxially grown. In this connection, tin dioxide cannot be selectively oriented in specified crystal planes by a conventional dip coating method. Therefore, tin dioxide does not show high crystallinity.

In execution of the production method, it is preferable for the raw material solution to contain antimony or fluorine. Existence of antimony or fluorine in the coating improves the conductivity of the coating. In the case where the coating has high conductivity, since the inner resistance of the lead-acid battery is lowered, the life performance of the lead-acid battery becomes further excellent. In the case of comparison of antimony with fluorine, antimony is better.

The lead-acid battery of the present invention is characterized in that the battery is provided with the above-mentioned positive electrode current collector. Accordingly, since the life performance of the positive electrode current collector is heightened, the lead-acid battery with high energy density and a long life can be provided in a low cost.

As described above, in the case where a lead-acid battery is produced using a positive electrode current collector according to the present invention, the life performance of the lead-acid battery becomes excellent.

The present application is based on Japanese Patent Application (JP-A No. 2005-285131) filed on Sep. 29, 2005, the disclosure of which is hereby incorporated by reference in its entirety.

Finally, the relevancy of the present invention and the above-mentioned Japanese Patent No. 3271906 will be described. Japanese Patent No. 3271906 discloses a production method of forming a tin dioxide coating with high crystallinity on the surface of a glass substrate. However, the production method described in Japanese Patent No. 3271906 does not relate to a positive electrode current collector for a lead-acid battery. The production method including a first stage and a second stage described in Japanese Patent No. 3271906 is combined with titanium or the like, which is a current collector substrate of a positive electrode current collector to be used in the present invention, since the conductivity of the undercoat layer formed in the first stage becomes too low, only a positive electrode current collector which cannot be practically usable as the positive electrode current collector is obtained. The production cost is also increased.

DETAILED DESCRIPTION OF THE PREFERRED EMBODIMENTS (1) First Embodiment (1.1) Production of Positive Electrode Current Collector In Example 1, a mixed solution of a dibutyltin diacetate solution (solvent: ethanol) and an antimony chloride solution (solvent: ethanol) was used as a raw material solution. In this case, the amount of dibutyltin diacetate was adjusted to be 2.5% by mass on the basis of tin dioxide in the entire raw material solution. Further, the amount of antimony chloride was adjusted to be 2.5% by mass on the basis of antimony to tin dioxide.

The raw material solution was intermittently sprayed to the surface of a flat plate-like current collector substrate heated to 450° C. At the time of spraying, the spraying intervals were controlled so as to keep the temperature of the current collector substrate at 450° C. Accordingly, thermal decomposition is caused on the surface of the current collector substrate to form a coating of tin dioxide. The obtained substrate was set as a positive electrode current collector of Example 1.

Next, to compare with Example 1, a positive electrode current collector of a conventional example 1 was produced. The conventional example 1 was produced by a dip coating method using a raw material solution prepared by dissolving tin tetrachloride, antimony trichloride, and a small amount of hydrochloric acid in propanol. That is, a flat plate-like current collector substrate similar to that of Example 1 was immersed in the raw material solution, pulled up at 30 cm/min, dried for 15 minutes, and thereafter kept still in an electric furnace heated to 500° C. for 30 minutes to form a tin dioxide coating. The obtained substrate was set as a positive electrode current collector of the conventional example 1.

(1.2) Results of X-Ray Diffractometry

Figure 1:
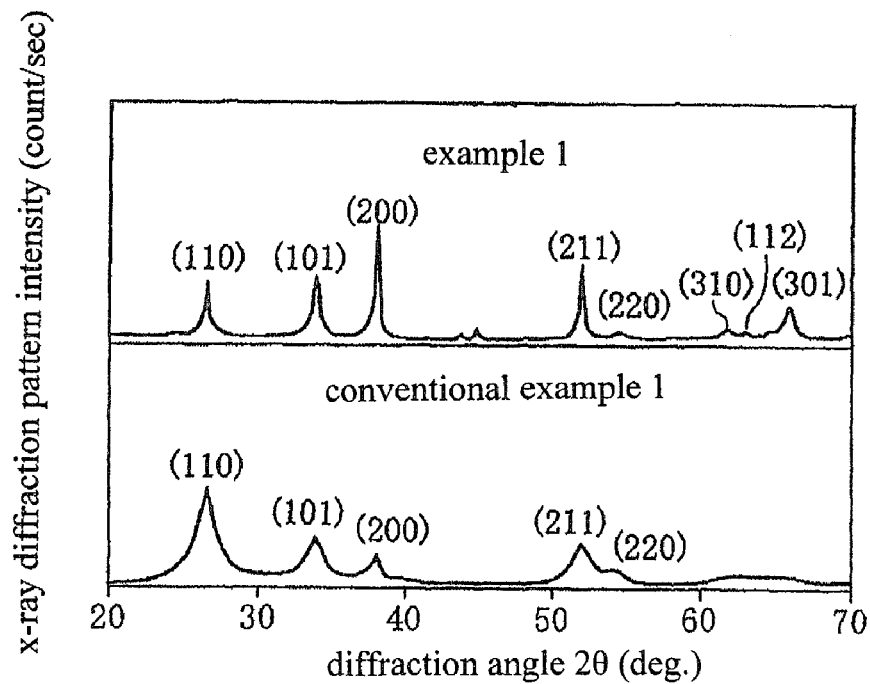
FIG. 1 is a view showing an x-ray diffraction pattern of a tin dioxide coating in a positive electrode current collector according to Example of the present invention.

FIG. 1 shows the x-ray diffraction pattern of the positive electrode current collector of Example 1 and the x-ray diffraction pattern of the positive electrode current collector of the conventional example 1. The XRD peak of Example 1 is sharp as compared with that of the conventional example 1.

Table 1 shows the half width of a peak with the maximum intensity in Example 1 and the conventional example 1. The crystal plane of the peak with the maximum intensity is a (200) plane for Example 1 and a (110) plane for the conventional example 1.

TABLE 1

| | Crystal plane | Half width |
|---|---|---|
| Conventional example 1 | (110) | 2.21° |
| Example 1 | (200) | 0.68° |

As shown in Table 1, in the conventional example 1, the half width of the peak of the (110) plane in which the intensity was the maximum was rather higher than 1°. On the other hand, in Example 1, the half width of the peak of the (200) plane in which the intensity was the maximum was sufficiently lower than 1°.

Accordingly, in the case of the tin dioxide coating of the conventional example 1, it is supposed that the crystallinity of the coating is low and points where the distance between a tin atom and an oxygen atom is not as in a standard crystal state are many. On the other hand, in the case of the tin dioxide coating of Example 1, it is supposed that the crystallinity of the coating is high and points where the distance between a tin atom and an oxygen atom is as in a standard crystal state are many.

Next, the texture coefficient TC of each crystal plane in Example 1 and the conventional example 1 was calculated. The results are shown in Table 2.

Herein, "texture coefficient TC" is an index for evaluating orientation of a crystal plane which can be calculated according to the following expression (1). In the expression (1), $I(hkl)$ is an x-ray diffraction intensity in a (hkl) plane; $I_0(hkl)$ is a standard intensity of each crystal plane of a tin dioxide obtained according to JCPDS (No. 41-1445). N denotes the number of diffraction lines. Herein, calculation was carried out using diffraction line number N=31 (2θ=26.6° to 108.4°). Accordingly, if the texture coefficient TC is 1 or lower, no crystal orientation occurs in the crystal plane and if it is 31, the maximum value, the crystal is completely oriented in the crystal plane and it means that the orientation becomes higher as the texture coefficient TC is further higher than 1.

However, in the calculation method according to the following expression (1), even if a crystal with high orientation is not actually formed in a crystal plane with a small standard intensity, 1 or higher texture coefficient TC is sometimes given by the calculation. Accordingly, the following crystal planes were selected; a (110) plane, a (101) plane, a (200) plane, a (211) plane, a (220) plane, a (310) plane, a (112) plane, and a (301) plane; which are crystal planes having standard intensity of 10 or higher in the case where the standard intensity of a (110) plane having the highest standard intensity obtained from the JCPDS was set to be 100 and the texture coefficient TC was calculated only for 8 kinds of them according to the expression (1) to employ the resulting values as the orientation indications.

Expression 1

$$TC = \frac{\frac{I(hkl)}{I_0(hkl)}}{\frac{1}{N}\sum_N \frac{I(hkl)}{I_0(hkl)}} \quad (1)$$

TABLE 2

| Crystal plane of tin dioxide (hkl) | Texture coefficient TC | |
|---|---|---|
| | Conventional example 1 | Example 1 |
| (110) | 0.53 | 0.32 |
| (101) | 0.33 | 0.52 |
| (200) | 0.71 | 3.21 |
| (211) | 0.36 | 0.68 |
| (220) | 0.56 | 0.28 |
| (310) | 0.52 | 0.68 |
| (112) | 0.55 | 0.42 |
| (301) | 0.42 | 1.34 |

As shown in Table 2, the texture coefficient TC of each crystal plane was sufficiently lower than 1 in the case of the tin dioxide coating of the conventional example 1 and the crystal was not selectively oriented in any crystal plane and the crystallinity was thus inferior. On the other hand, since the texture coefficient TC of the (200) plane and the (301) plane was 1 or higher and crystal was selectively oriented in these two types of crystal planes in the case of the tin dioxide coating of Example 1.

(1.3) Life Test

Figure 2:
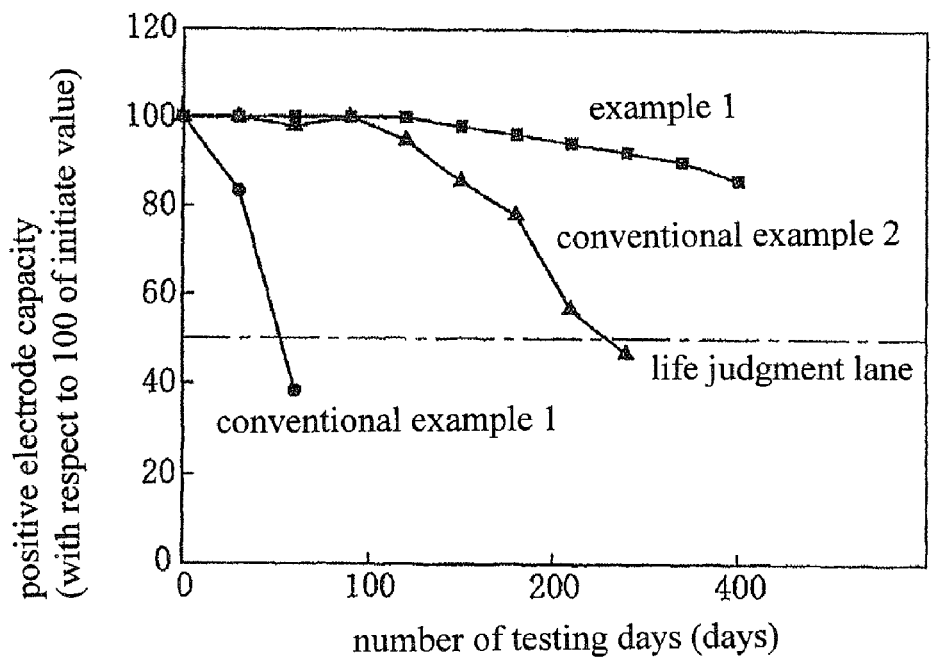
FIG. 2 is a view showing the results of a life test according to Example of the present invention.

FIG. 2 shows a life test using positive electrode current collectors of Example 1 and the conventional example 1. The method of the life test was as follows.

At first, according to a common production method of a lead-acid battery, an active material paste was produced by kneading a lead powder, water, and sulfuric acid. Thereafter, the active material paste was packed in a frame with 10 mm in diameter×8 mm in thickness and dried to obtain active material pellet. The pellet was put in a diluted sulfuric acid solution with a concentration of 20% and electric current at 50 mA was applied to carry out formation and charging.

The active material pellet was formed in a flat plate-like shape and put on the positive electrode current collectors of Example 1 and the conventional examples 1 and 2 and while being press-bonded by pressure around 100 kPa, these active material pellet and positive electrode current collectors were immersed in a diluted sulfuric acid solution with a concentration of 40% to obtain positive electrode plates. A lead plate was used as a negative electrode plate.

Respective test cells were assembled using the above-mentioned positive electrode plates and negative electrode plate. Constant voltage of 2.3 V was applied to the respective test cells to carry out a constant voltage overcharging test at 65° C. in a vapor phase.

The test cells were periodically taken out of the test environments and left at room temperature for 24 hours. Thereafter, discharge at 150 mA was carried out to measure the positive electrode capacities. The moment the measured positive electrode capacity became below 50% of the initial value was determined to be the time of termination. The days until the time the life was terminated was defined as the life performance (days).

The results of the life test according to the above-mentioned method are shown in FIG. 2. FIG. 2 also shows the results of a test carried out for comparison of a positive electrode current collector of a conventional example 2 obtained by electrodepositing a lead dioxide layer on the surface of the tin dioxide coating formed in the conventional example 1. The tin dioxide layer was carried out by electrodeposition by applying electric current at current density of 5 to 10 mA/cm$^2$ and a temperature of 40 to 50° C. in a 4 to 5 N sodium hydroxide solution in which lead hydroxide was saturated.

According to FIG. 2, the life performance of the positive electrode current collector of the conventional electrode 1 was shorter than 100 days. On the other hand, the life performance of the positive electrode current collector of Example 1 exceeded 400 days. Even beyond 400 days, decrease of the positive electrode capacity was slight. The life performance of the positive electrode current collector of the conventional example 2 slightly exceeded 200 days.

Herein, the life performance of the normal lead-acid battery measured in the constant voltage overcharging test at 65° C. is around 120 days in the case of a common product and it is around 240 days in the case of a product planed to have a long life. Accordingly, it can be said that the cycle life performance of the lead-acid battery using the positive electrode current collector of Example 1 is remarkably excellent as compared with those of these common product and product planed to have a long life.

(1.4) Production of Cell, Production of Lead-Acid Battery, and Life Test of Lead-Acid Battery A cell 1 was produced using the positive electrode current collector of Example 1. A cell 1 was produced using the positive electrode current collector of the conventional example 1

Figure 3:
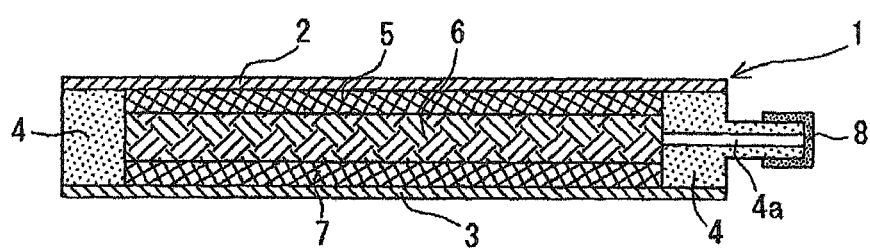
FIG. 3 is a vertical cross sectional view showing the structure of a cell using the current collector substrate of titanium for a positive electrode plate according to Example of the present invention.

The structure of the cell 1 is shown in FIG. 3. A battery case 4 is an insulating frame body for an air-tightly housing a positive electrode active material 5, a separator 6, and a negative electrode active material 7 and sandwiched between a positive electrode current collector 2 and a negative electrode current collector 3. The battery case 4 is provided with a gas discharge port 4a communicated to the outside. The aperture part of the gas discharge port 4a is provided with a control valve 8. The positive electrode active material 5, the separator 6, and the negative electrode active material 7, are arranged in the inside of the battery case 4. The positive electrode active material 5, the separator 6, and the negative electrode active material 7 are impregnated with an electrolyte solution containing diluted sulfuric acid as a main component.

The positive electrode current collector 2 was provided with the positive electrode active material 5 to produce a positive electrode plate. Herein, the positive electrode active material 5 was a plate-like active material containing mainly lead dioxide ($PbO_2$). The negative electrode current collector 3 was a copper plate (thickness: 0.1 mm) plated with lead (thickness: 20 to 30 μm). The negative electrode current collector 3 was provided with the negative electrode active material 7 to produce a negative electrode plate. Herein, the negative electrode active material 7 was a plate-like active material of mainly sponge-like metal lead. The separator 6 was like a mat produced from glass fibers. The positive electrode plate and the negative electrode plate were layered with the separator interposed therebetween and housed in a container. The container was covered with a cover and the electrolyte solution was injected to produce the cell 1 of a lead-acid battery.

Figure 4:
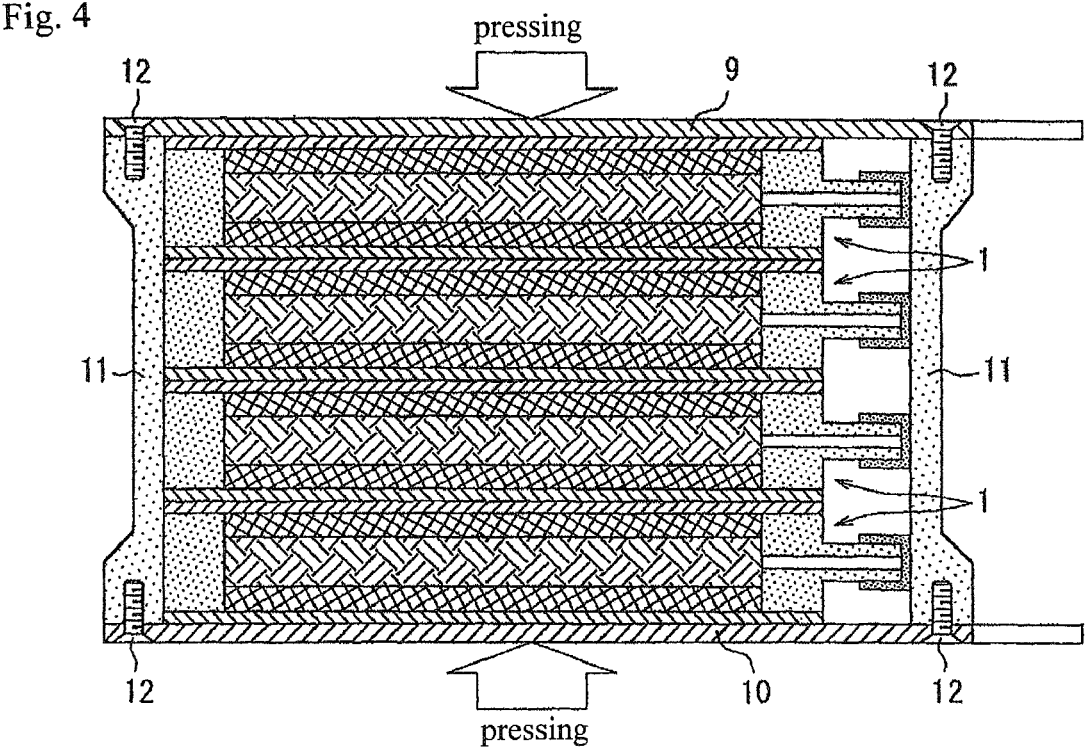
FIG. 4 is a vertical cross sectional view showing the structure of a lead-acid battery having four combined cells shown in FIG. 3 according to Example of the present invention.

Next, a lead-acid battery of Example 1 was produced using four cells 1 produced using the positive electrode current collector of Example 1. Further, a lead-acid battery of the conventional example 1 was produced using four cells 1 produced using the positive electrode current collector of conventional example 1. The configuration example is shown in FIG. 4. The lead-acid batteries are lead-acid batteries for an uninterruptible power supply apparatus (hereinafter, referred to lead-acid battery for UPS using UPS as abbreviation of Uninterruptible Power Supply). The lead-acid battery produced using the positive electrode current collector of the present invention was remarkably excellent in the life performance and therefore was particularly useful for UPS.

The negative electrode current collector 3 of the cell 1 was set on the positive electrode current collector 2 of another cell and in such a manner, four cells 1 were layered and connected in series. The pressing members 9 and 10 made of a conductive material such as a metal plate were set on the top and the bottom of the four cells 1. The circumferences of the cells were surrounded with an auxiliary frame material 11 of an insulating material such as a resin or the like. The pressing members 9 and 10 were fixed respectively in the top and bottom end faces of the auxiliary frame material 11 with a plurality of screws 12 to firmly press, pinch, and fix the four cells 1. These pressing members 9 and 10 were directly press-bonded with the positive electrode current collector 2 and the negative electrode current collector 3 and therefore, they could be used as positive and negative electrode terminals.

Herein, in the respective pinched and fixed cells 1, the separators 6 were in compressed state. Due to the repulsive force, the positive electrode active material 5 was pushed to the positive electrode current collectors 2 at gauge pressure of around 250 kPa and the negative electrode active material 7 was pushed to the negative electrode current collectors 3. To obtain the pressing force by the separators 6, the material and the thickness for the separators 6 may be adjusted properly. The pressing force can be changed properly in accordance with the structure, the capacity, and the size of the cells 1. Generally, the charge discharge performance can be stabilized by applying gauge pressure of around 100 to 400 kPa.

With respect to the lead-acid batteries of Example 1 and the conventional example 1 (nominal capacities are both 2.3 Ah), the energy density per weight at the time of discharge at 0.5 A and the life performance were compared. As a result, the energy density per weight was 50 Wh/kg for both. The life performance was 15 months for Example 1 and 7 months for the conventional example. The life performance of Example 1 was remarkably excellent as compared with that of the conventional example 1.

(1.5) Production Cost

The cost to produce the positive electrode current collector of Example 1 and the cost to produce the positive electrode current collector of the conventional example 2 are estimated. Both are compared. As a result, the cost for producing the positive electrode current collector of Example 1 is about one fifth of that of the conventional example 2. In the conventional example 2, since the lead dioxide layer was electrodeposited further on the surface of the tin dioxide coating formed by the dip coating method, the production efficiency was low. The production method of the invention can be said to be excellent as compared with the conventional production method.

(1.6) Others

In Example 1, dibutyltin diacetate was used for the raw material solution. However, even in the case where an organic tin compound such as tributoxytin or an inorganic tin compound such as tin tetrachloride was used, if the half width of a peak with the maximum intensity among peaks of tin dioxide in the x-ray diffraction pattern of the positive electrode current collector was 1° or lower, the life performance of the lead-acid battery using the positive electrode current collector was excellent.

Not limited to the case the selectively oriented crystal planes were (200) plane and (301) plane as Example 1, even in the case where the planes were, for example, (110) plane, (101) plane, and (211) plane, the same results were obtained. That is, it was confirmed that the orientation did not depend on the types of crystal planes.

Although at least one crystal plane is necessary for selective orientation, even in the case of 2 to 4 crystal planes, the same results of the test were obtained regardless of the combinations of these crystal planes. However, in the case of orientation in 5 or more crystal planes, the points where the crystals of different crystal planes were adjacent to each other were increased and therefore the crystallinity was not sufficiently heightened and consequently, similar to the case of the conventional example 1, the life performance was not excellent.

In the lead-acid battery of the first embodiment, an example in which four cells 1 were combined was employed. However, the lead-acid battery may be composed using only one or the lead-acid battery may be composed by combining an arbitrary number of 2 or more of cells 1. Further, although the screws 12 were employed for pressing the cells 1 by the pressing member 9 and 10 in the lead-acid battery, the fixation means is arbitrary. For example, it may be caulking.

(2) Second Embodiment (2.1) Production of Positive Electrode Current Collector

Positive electrode current collectors were produced while changing the heating temperature of the current collector substrates when the raw material solution was intermittently sprayed to 300° C., 350° C., 380° C., 400° C., 420° C., 450° C., or 450° C. At the time of spraying, the heating temperature was prevented from lowering. The raw material solution to be used was the same raw material solution as in the above-mentioned first embodiment.

The case where the heating temperature of the current collector substrate was 300° C. was set to be Comparative Example 1; the case of 350° C. was set to be Comparative Example 2; the case of 380° C. was set to be Comparative Example 3; the case of 400° C. was set to be Example 2-1; the case of 420° C. was set to be Example 2-2; the case of 450° C. was set to be Example 2-3; and the case of 500° C. was set to be Example 2-4.

(2.2) Results of X-Ray Diffractometry

In the x-ray diffraction patterns of the positive electrode current collectors of Comparative Examples 1, 2, and 3 and Examples 2-1, 2-2, 2-3, and 2-4, the crystal planes of peaks with the maximum intensity among peaks of tin dioxide and the half width of the peaks are shown in Table 3.

TABLE 3

| | Surface temperature of current collector substrate | Crystal plane | Half width |
|---|---|---|---|
| Comparative example 1 | 300° C. | (200) | 2.80° |
| Comparative example 2 | 350° C. | (200) | 1.31° |
| Comparative example 3 | 380° C. | (200) | 1.10° |
| Example 2-1 | 400° C. | (200) | 1.00° |
| Example 2-2 | 420° C. | (200) | 0.91° |
| Example 2-3 | 450° C. | (200) | 0.68° |
| Example 2-4 | 500° C. | (200) | 0.64° |

Figure 5:
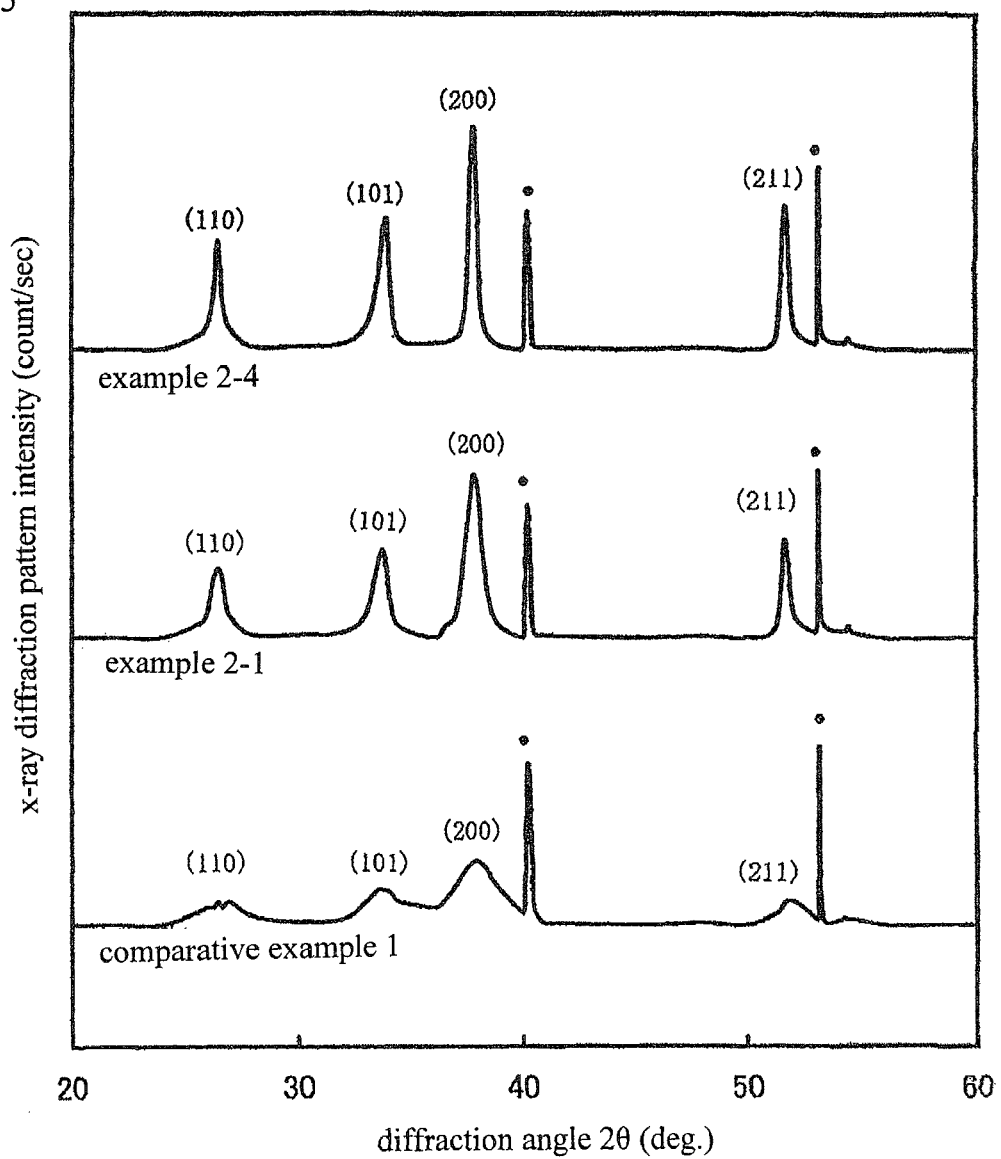
FIG. 5 is a view showing an x-ray diffraction pattern of a positive electrode current collector, in which the heating temperature of the current collector substrate is changed, according to Example of the present invention.

Further, the x-ray diffraction patterns of tin dioxide coatings in the positive electrode current collectors of Comparative Example 1, Example 2-1, and Example 2-4 are shown in FIG. 5. The encircled peaks in FIG. 5 were attributed to titanium.

In the x-ray diffraction pattern of Comparative Example 1, the peak curves of the respective crystal planes were very gentle slopes. The half width of the peak of the (200) plane was wide. The crystallinity was supposed to be very low.

On the other hand, in the x-ray diffraction pattern of Example 2-1, the peak curves of the respective crystal planes were steep. The half width of the peak of the (200) plane was narrow. The crystallinity was supposed to be high. In the x-ray diffraction pattern of Example 2-4, the peak curves of the respective crystal planes were steeper. The half width of the peak of the (200) plane was narrower. The crystallinity was supposed to be very high.

As shown in Table 3, in the case where the heating temperature was 300° C. (Comparative Example 1), 350° C. (Comparative Example 2), or 380° C. (Comparative Example 3), the crystallinity was low and the half width was higher than 1°. In the case where the heating temperature was 400° C. in Example 2-1, the half width was 1.00°. Further, in the case where the heating temperature was 420° C. in Example 2-2, the half width was 0.91°. Further, in the case where the heating temperature was as high as 450° C. (Example 2-3) and 500° C. (Example 2-4), the crystallinity was sufficiently high and the half width was sufficiently low than 1°.

(2.2) Results of Life Performance

For lead-acid batteries produced using the positive electrode current collectors of Comparative Examples 1, 2, and 3 and Examples 2-1, 2-2, 2-3, and 2-4, the life performance test was carried out. The method for the life performance was the same as in the first embodiment.

Figure 6:
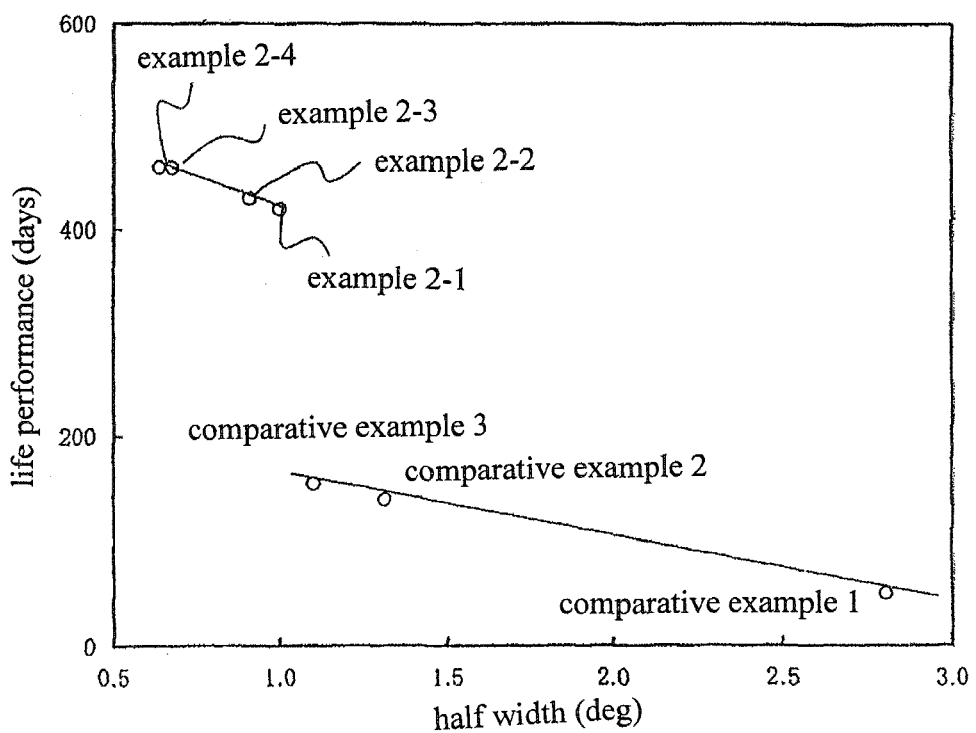
FIG. 6 is a view showing a relation between the half width of a peak with the maximum intensity among peaks of tin dioxide in the x-ray diffraction pattern of the positive electrode current collector and the life performance.

Results of the life performance test are shown in FIG. 6. The abscissa axis of FIG. 6 shows the half width of XRD peak with the maximum intensity and the ordinate axis shows the life performance. The definition of the life performance is described in the first embodiment.

The life performance of the positive electrode current collectors of Examples 2-1, 2-2, 2-3, and 2-4 exceeded 400 days. However, the life performance of the positive electrode current collectors of Comparative Examples 1, 2, and 3 was 200 days or shorter.

According to the above-mentioned results, in the case where the half width of peak with the maximum intensity among peaks of tin dioxide became 1° or lower in the x-ray diffraction pattern of the positive electrode current collector, the life performance became excellent.

(3) Third Embodiment

In a third embodiment, how the number of selectively oriented crystal planes affected the life performance of the lead-acid battery was investigated.

(3.1) Production of Positive Electrode Current Collector

The spraying amount of the raw material solution per one time in the production process affects the number of the selectively oriented crystal planes. Further, whether annealing treatment is carried out or not for titanium to which spraying is carried out also affects the number of the selectively oriented crystal planes. Therefore, titanium which was not annealed and titanium which was annealed were used to produce positive electrode current collectors. The spraying amount of the raw material solution per one time was variously changed. Hereinafter, specific explanation will be given.

Using titanium which was not annealed as a current collector substrate, the raw material solution was intermittently sprayed. In the case of spraying, the spraying amount per one time was changed to be 0.2 cc, 0.4 cc, 0.6 cc, and 0.8 cc to form a titanium dioxide coating on the current collector substrate. The heating temperature of the current collector substrate was 550° C.

Further, using titanium which was annealed in vacuum atmosphere as a current collector substrate, a titanium dioxide coating was formed on the current collector substrate by adjusting the spraying amount per time to be 0.2 cc and 0.4 cc. The raw material solution was the same as in Example 1.

(3.2) Results of X-Ray Diffractometry

In the case where the spraying amount was 0.2 cc/time, there were 2 selectively oriented crystal planes. In the case where the spraying amount was 0.4 cc/time, there were 4 selectively oriented crystal planes. In the case where the spraying amount was 0.6 cc/time, there were 5 selectively oriented crystal planes.

As described above, as the spraying amount was increased more, the number of the selectively oriented crystal planes was increased more. It is supposed to be because the heating temperature was high and the ambient temperature in the periphery of the current collector substrate was so sufficiently increased as to cause the thermal decomposition and also because, similarly to the case of a dip coating method, due to the increased thickness of the liquid film of the raw material solution sprayed to the surface of the current collector substrate, crystals were contained which were grown using crystal cores in crystal planes in various directions produced in the liquid film without using the crystal on the surface of the current collector substrate as the undercoating layer.

In the case of using the current collector substrate of titanium which was annealed in vacuum atmosphere, in the case where the spraying amount per one time was set to be 0.2 cc, there was one selectively oriented crystal plane and in the case where it was set to be 0.4 cc, there were three selectively oriented crystal planes.

The above-mentioned results are collectively shown in Table 4.

TABLE 4

| Current collector substrate | Spraying amount per one time | Number of selectively oriented crystal planes |
|---|---|---|
| Titanium not annealed | 0.2 cc | 2 |
| | 0.4 cc | 4 |
| | 0.6 cc | 5 |
| | 0.8 cc | 6 |
| Titanium annealed in vacuum atmosphere | 0.2 cc | 1 |
| | 0.4 cc | 3 |

(3.3) Results of Life Performance

The life performance test was carried out for 5 kinds of positive electrode current collectors produced in the third embodiment. The method of the life performance test was the same as in Example 1.

Figure 7:
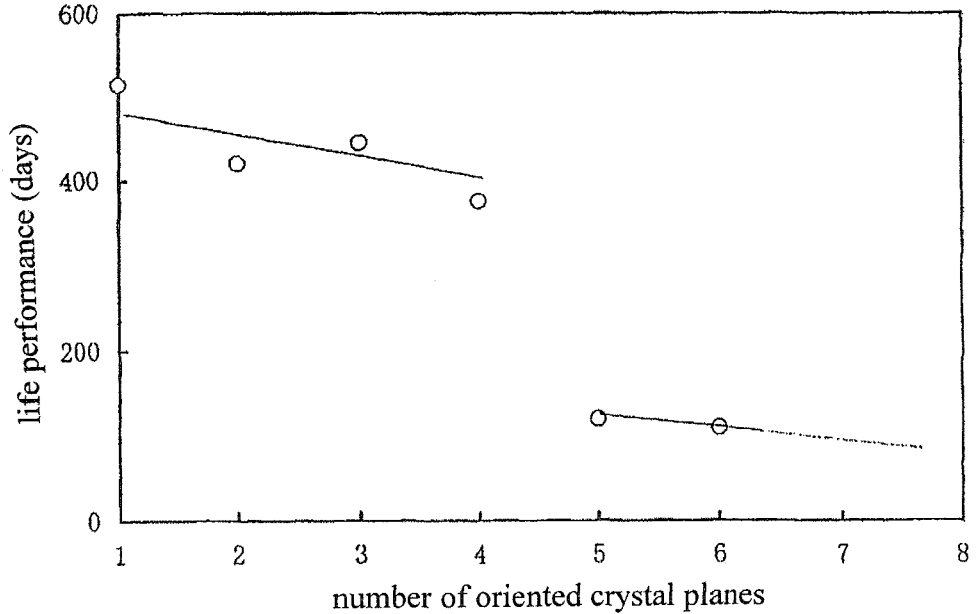
FIG. 7 is a view showing a relation between the number of crystal planes having oriented tin dioxide crystals and the life performance.

The results of the life performance test are shown in FIG. 7. In FIG. 7, the abscissa axis shows the number of the selectively oriented crystal planes and the ordinate axis shows the life performance.

According to FIG. 7, in the case where the number of the selectively oriented crystal planes was 1 or more and 4 or less, the life performance was excellent. However, in the case where the number of the selectively oriented crystal planes was 5 or more, the life performance was considerably inferior as compared with that in the case where the number was 4 or less. There was significant difference of life performance between the case of 4 and the case of 5.

It is supposed that the life performance was inferior in the case where the number of the selectively oriented crystal planes was 5 or more because the points where crystals of different crystal planes are adjacent to one another are increased and therefore the chemical stability is lowered.

The present invention relates to a positive electrode current collector for a lead-acid battery having a coating on the surface. A lead-acid battery equipped with the positive electrode current collector shows extremely excellent life performance. Accordingly, the present invention can be applied widely in industrial spheres.

What is claimed is:

1. A method for producing a lead-acid battery, comprising:
   providing an organic solvent solution comprising an organotin compound, and antimony; and
   spraying the solution on a surface of a current collector substrate of titanium or a titanium alloy to produce a positive electrode current collector for a lead-acid battery comprising a coating of tin dioxide containing antimony formed on the surface of the current collector substrate,
   wherein the half width of a peak with the maximum intensity among peaks of tin dioxide in the x-ray diffraction pattern of said positive electrode current collector for a lead-acid battery is 1° or lower,
   wherein crystals of said tin dioxide are selectively oriented in crystal planes, the number of the crystal planes selectively oriented being 1 to 4,
   wherein a (200) plane is the maximum among the crystal planes,
   wherein the coating has been made by an intermittent repeat of spraying said solution,
   wherein each of the spraying has formed a layer of said tin oxide, each layer of the tin oxide having a thickness of 5 nm or less.

2. A method for producing a lead-acid battery according to claim 1, wherein the organotin compound is dibutyltin diacetate.

* * * * *